US012770885B2

(12) United States Patent
Hong et al.

(10) Patent No.: US 12,770,885 B2
(45) Date of Patent: Oct. 20, 2026

(54) NEGATIVE ELECTRODE, METHOD FOR MANUFACTURING THE SAME, AND SECONDARY BATTERY COMPRISING THE SAME

(71) Applicant: LG ENERGY SOLUTION, LTD., Seoul (KR)

(72) Inventors: Yeon Suk Hong, Daejeon (KR); Suk Il Youn, Daejeon (KR); Joon Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 956 days.

(21) Appl. No.: 17/768,690

(22) PCT Filed: Nov. 6, 2020

(86) PCT No.: PCT/KR2020/015449
§ 371 (c)(1),
(2) Date: Apr. 13, 2022

(87) PCT Pub. No.: WO2021/091278
PCT Pub. Date: May 14, 2021

(65) Prior Publication Data

US 2024/0030457 A1 Jan. 25, 2024

(30) Foreign Application Priority Data

Nov. 8, 2019 (KR) ........................ 10-2019-0142958

(51) Int. Cl.
*H01M 4/66* (2006.01)
*H01M 4/02* (2006.01)
(Continued)

(52) U.S. Cl.
CPC ......... *H01M 4/667* (2013.01); *H01M 4/0404* (2013.01); *H01M 4/382* (2013.01); *H01M 10/052* (2013.01); *H01M 2004/027* (2013.01)

(58) Field of Classification Search
CPC .... H01M 4/667; H01M 4/0404; H01M 4/382; H01M 10/052; H01M 2004/027
See application file for complete search history.

(56) References Cited

U.S. PATENT DOCUMENTS 6,573,004 B1 6/2003 Igarashi et al.
2003/0062259 A1* 4/2003 Mushiake .............. H01G 11/38 204/290.01

(Continued)

FOREIGN PATENT DOCUMENTS

CN 105374571 A 3/2016
CN 106128791 A 11/2016

(Continued)

OTHER PUBLICATIONS

JP2018181705A—Machine Translation (Year: 2018).*

(Continued)

*Primary Examiner* — Stewart A Fraser
*Assistant Examiner* — Patrick Marshall Greene
(74) *Attorney, Agent, or Firm* — Birch, Stewart, Kolasch & Birch, LLP

(57) ABSTRACT

Disclosed is a method for manufacturing of a negative electrode, a negative electrode, and a secondary battery, wherein the method includes forming a polymer layer on a rear surface of a current collector, forming a preliminary negative electrode active material layer on a front surface of the current collector, and forming a pre-lithiation layer including lithium on the preliminary negative electrode active material layer, wherein the polymer layer includes a copolymer having a first unit represented by Formula 1, and (Continued)

at least one of a second unit represented by Formula 2 or a third unit represented by Formula 3.

7 Claims, 2 Drawing Sheets

(51) Int. Cl.

| | |
|---|---|
| ***H01M 4/04*** | (2006.01) |
| ***H01M 4/38*** | (2006.01) |
| ***H01M 10/052*** | (2010.01) |

(56) References Cited

U.S. PATENT DOCUMENTS

| | | | | |
|---|---|---|---|---|
| 2013/0260205 | A1* | 10/2013 | Kwon | H01M 4/66 429/211 |
| 2015/0318555 | A1 | 11/2015 | Oku et al. | |
| 2018/0323430 | A1 | 11/2018 | Son et al. | |
| 2019/0372096 | A1 | 12/2019 | Chae et al. | |
| 2020/0014031 | A1 | 1/2020 | Oh et al. | |
| 2020/0058929 | A1 | 2/2020 | Chae et al. | |
| 2020/0303722 | A1 | 9/2020 | Chae et al. | |
| 2021/0036314 | A1 | 2/2021 | Chae et al. | |
| 2021/0336272 | A1 | 10/2021 | Oh et al. | |
| 2022/0013859 | A1* | 1/2022 | Kim | H01M 50/446 |

FOREIGN PATENT DOCUMENTS

| | | | |
|---|---|---|---|
| CN | 107134561 | A | 9/2017 |
| CN | 108028422 | A | 5/2018 |
| CN | 110168783 | A | 8/2019 |
| CN | 110392946 | A | 10/2019 |
| DE | 38 38 329 | A1 | 5/1989 |
| JP | 11-45738 | A | 2/1999 |
| JP | 2011-28883 | A | 2/2011 |
| JP | 6079782 | B2 | 2/2017 |
| JP | 2018-181705 | A | 11/2018 |
| JP | 2019-169360 | A | 10/2019 |
| KR | 10-0601749 | B1 | 7/2006 |
| KR | 10-2014-0032577 | A | 3/2014 |
| KR | 10-2016-0059688 | A | 5/2016 |
| KR | 10-1829761 | B1 | 2/2018 |
| KR | 10-2019-0017149 | A | 2/2019 |
| KR | 10-2019-0022332 | A | 3/2019 |
| KR | 10-2019-0046688 | A | 5/2019 |
| KR | 10-2019-0090723 | A | 8/2019 |
| KR | 10-2019-0121051 | A | 10/2019 |

OTHER PUBLICATIONS

Dent et al., "GPC/SEC Practical Tips and Tricks", Agilent Technologies, Oct. 2011, pp. 1-38.

Extended European Search Report for European Application No. 20885609.6, dated Nov. 21, 2022.

Ghosh, "Molecular Weights of Polymers," Polymer Science: Fundamentals of Polymer Science, Sep. 21, 2006, pp. 1-22.

Cho et al., "Partially Carbonized Poly (Acrylic Acid) Grafted to Carboxymethyl Cellulose as an Advanced Binder for Si Anode in Li-ion Batteries", Journal of Electrochemical Science and Technology, vol. 10, No. 2, 2019, pp. 131-138.

International Search Report (PCT/ISA/210) issued in PCT/KR2020/015449, dated Feb. 17, 2021.

* cited by examiner

NEGATIVE ELECTRODE, METHOD FOR MANUFACTURING THE SAME, AND SECONDARY BATTERY COMPRISING THE SAME

CROSS-REFERENCE TO RELATED APPLICATIONS

This application claims the benefit of Korean Patent Application No. 10-2019-0142958, filed on Nov. 8, 2019, in the Korean Intellectual Property Office, the disclosure of which is incorporated herein in its entirety by reference.

TECHNICAL FIELD

The present invention provides a negative electrode, a method for manufacturing the negative electrode, and a secondary battery including the negative electrode in order to reduce the deformation of a pre-lithiated negative electrode.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having a high energy density, that is lithium secondary batteries having a high capacity, have been subjected to considerable research and also have been commercialized and widely used.

In general, a secondary battery is composed of a positive electrode, a negative electrode, an electrolyte, and a separator. Among the above, the negative electrode includes a current collector and a negative electrode active material layer disposed on the current collector and including a negative electrode active material. In order to increase the energy density of the battery, various negative electrode active materials such as silicon is used. However, there is a problem in that the capacity of a battery is reduced due to a high irreversible capacity and the lifespan properties of the battery are deteriorated.

In order to solve the above problem, a pre-lithiation method in which an irreversible site in a negative electrode is first filled with lithium has been introduced. As the pre-lithiation method, a method for disposing a lithium metal on a negative electrode active material layer to complete a negative electrode, and then impregnating the negative electrode in a secondary battery, and the like is used.

Meanwhile, the secondary battery includes an electrode assembly, and a negative electrode positioned closest to the outermost periphery of the electrode assembly may be a single-sided negative electrode. The single-sided negative electrode means that a negative electrode active material layer is positioned on only one surface of a current collector.

In manufacturing the single-sided negative electrode, if the above-described pre-lithiation process is performed (specifically, from the moment when a preliminary negative electrode active material layer 20 formed on a current collector 10 and a lithium metal (not shown) are bonded), strong stress is generated in the negative electrode active material layer 20' of the single-sided negative electrode due to the rapid volume expansion of a negative electrode active material into which lithium is inserted. Accordingly, the deformation in which both ends of the single-sided negative electrode are rolled toward an upper portion of the negative electrode active material layer 20' occurs (see FIG. 1), and thus, the single-sided negative electrode may not be seamlessly bonded in the electrode assembly. In addition, the distance between the single-sided negative electrode and a positive electrode increases in the battery, so that resistance of the battery increases and side reactions occur intensively, causing the deterioration in the performance of the battery, and the energy density of the battery is reduced.

Therefore, there is a demand for a new technology capable of minimizing the deformation of a pre-lithiated negative electrode.

DISCLOSURE OF THE INVENTION

Technical Problem

An aspect of the present invention provides a negative electrode, a method for manufacturing the negative electrode, and a secondary battery including the negative electrode, wherein the deformation of a pre-lithiated negative electrode is minimized, thereby reducing the defective rate of the integration of a negative electrode/a separator/a positive electrode during an electrode assembly assembling process and improving the energy density, lifespan, and durability of a battery, and reducing side reactions.

Technical Solution

According to an aspect of the present invention, there is provided a method for manufacturing of a negative electrode, the method including forming a polymer layer on the rear surface of a current collector, forming a preliminary negative electrode active material layer on the front surface of the current collector, and forming a pre-lithiation layer including lithium on the preliminary negative electrode active material layer, wherein the polymer layer includes a copolymer having a first unit represented by Formula 1 below, and at least one of a second unit represented by Formula 2 below and a third unit represented by Formula 3 below.

[Formula 1]

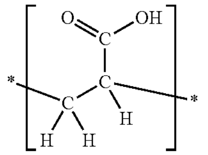

[Formula 2]

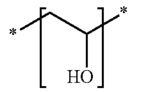

[Formula 3]

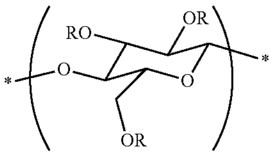

In Formula 3 above, R is each independently H or $CH_2CO_2H$.

According to another aspect of the present invention, there is provided a negative electrode including a current collector having a front surface and a rear surface, a negative electrode active material layer on the front surface of the current collector, and a polymer layer on the rear surface of the current collector, wherein the polymer layer includes a copolymer having a first unit represented by Formula 1 below, and at least one of a second unit represented by Formula 2 below or a third unit represented by Formula 3 below.

[Formula 1]

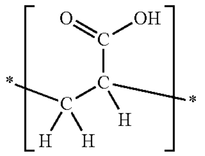

[Formula 2]

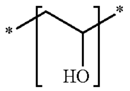

[Formula 3]

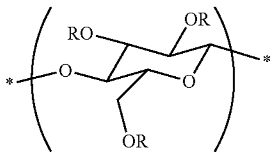

In Formula 3 above, R is each independently H or $CH_2CO_2H$.

According to yet another aspect of the present invention, there is provided a secondary battery including the negative electrode.

Advantageous Effects

According to the present invention, the deformation of a pre-lithiated negative electrode may be minimized through a polymer layer including a specific copolymer. Therefore, the defective rate of the local integration of a negative electrode/a separator/a positive electrode in an electrode assembly may be reduced, the energy density, lifespan, and durability of a battery may be improved, and local side reactions in the battery may be reduced.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
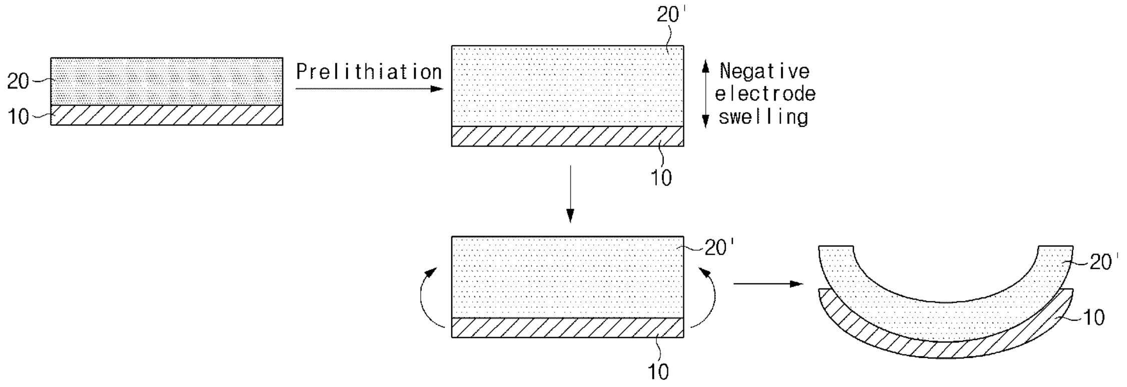
FIG. 1 Conventional Art
FIG. 1 is a schematic diagram showing a method for manufacturing a typical pre-lithiated negative electrode.

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the formulas herein, "*" denotes a binding site.

<Method for Manufacturing Negative Electrode>

A method for manufacturing of a negative electrode according to an embodiment of the present invention includes forming a polymer layer on the rear surface (back surface) of a current collector S1, forming a preliminary negative electrode active material layer on the front surface (front surface) of the current collector S2, and forming a pre-lithiation layer including lithium on the preliminary negative electrode active material layer S3, wherein the polymer layer may include a copolymer having a first unit represented by Formula 1 below, and at least one of a second unit represented by Formula 2 below and a third unit represented by Formula 3 below.

[Formula 1]

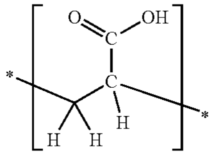

[Formula 2]

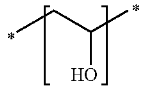

[Formula 3]

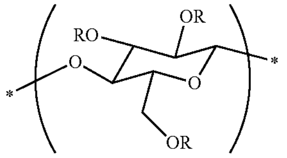

In Formula 3 above, R is each independently H or $CH_2CO_2H$.

1) Step S1

The current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the current collector may typically have a thickness of 3 μm to 500 μm, specifically 5 μm to 30 μm, and more preferably 6 μm to 15 μm. When the above range is satisfied, the energy density of the battery may be maintained at an appropriate level, and it is advantageous in terms of minimizing the deformation of the current collector due to pre-lithiation treatment by a polymer layer to be described later. Microscopic irregularities may be formed on the surface of the current collector to improve the adhesion of an active material. For example, the current collector may be used in various forms such as a film, a sheet, a foil, a net, a porous body, a foam, and a non-woven body.

The polymer layer may be disposed on the rear surface of the current collector.

The polymer layer may include a copolymer, and specifically, may be composed of a copolymer.

The copolymer may include a first unit, and at least one of a second unit and a third unit. Specifically, the copolymer may be composed of at least one of the first unit, the second unit, and the third unit.

The first unit may be a unit represented by Formula 1 below.

[Formula 1]

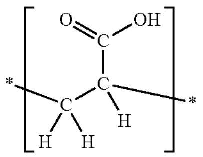

The copolymer includes the first unit of Formula 1 above, and thus, the electrochemical reactivity of the copolymer is reduced, so that the initial charge/discharge efficiency of the battery may be improved. In addition, the lithium reduction consumption in the negative electrode may be reduced by the first unit of Formula 1 above.

The first unit may be included in an amount of 10 mol % to 90 mol %, specifically 20 mol % to 80 mol %, more specifically 30 mol % to 60 mol % in the copolymer. When the above range is satisfied, the electrochemical reactivity of the copolymer is effectively reduced, and at the same time, a three-dimensional network structure may be formed at a desirable level by the polymerization with the second unit or the third unit, so that the deformation of the negative electrode may be reduced to a minimum.

The second unit may be a unit of Formula 2 below, and the third unit may be a unit of Formula 3 below.

[Formula 2]

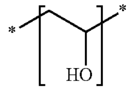

[Formula 3]

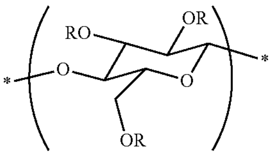

In Formula 3 above, R is each independently H or $CH_2CO_2H$.

The copolymer includes at least one of the second unit and the third unit, and thus, the brittleness of the copolymer may be improved.

Typically, when lithium is inserted into the preliminary active material layer according to a pre-lithiation process, excessive stress is generated in the preliminary negative electrode active material layer due to the volume expansion of a negative electrode active material in the preliminary active material layer. Accordingly, the deformation in which both ends of the negative electrode are rolled toward an upper portion of the negative electrode active material layer (see FIG. 1), and thus, the negative electrode may not be seamlessly bonded in an electrode assembly. In addition, the distance between the negative electrode and a positive electrode increases in the battery, so that resistance of the battery increases and side reactions occur intensively, causing the deterioration in the performance of the battery, and the energy density of the battery is reduced.

Figure 2:
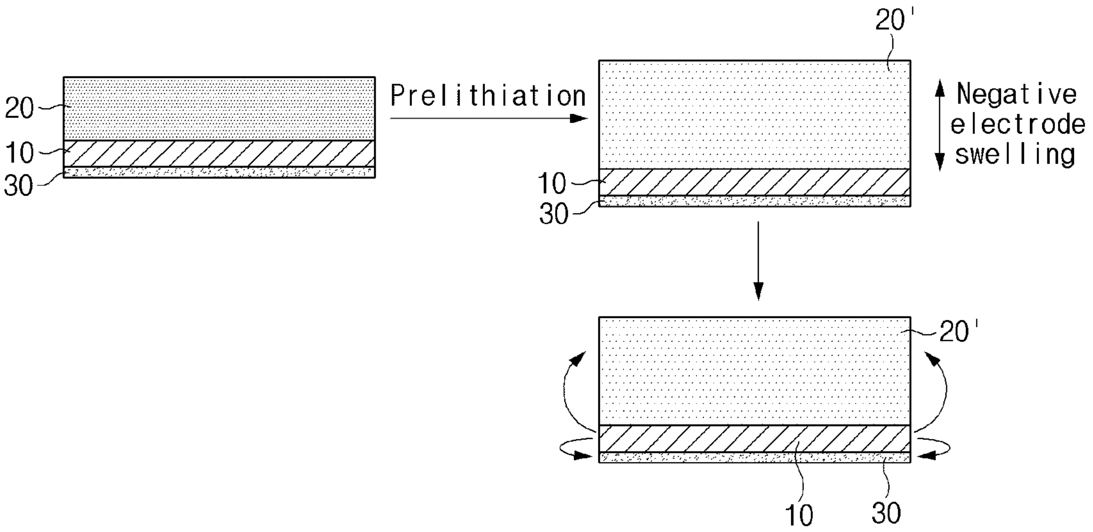
FIG. 2 is a schematic diagram showing a method for manufacturing a pre-lithiated negative electrode of the present invention.

On the other hand, referring to FIG. 2, in an embodiment of the present invention, the deformation of the negative electrode active material layer 20' (in the form in which lithium is inserted into the preliminary negative electrode active material layer 20 by pre-lithiation) and the current collector 10 may be suppressed by the polymer layer 30. Specifically, since a copolymer included in the polymer layer includes at least one of the second unit and the third unit, the brittleness of the polymer layer is increased, allowing the force to relieve the stress causing the deformation of the negative electrode to act, so that the deformation of the negative electrode may be suppressed more effectively.

The amount of the sum of the second unit represented by Formula 2 above and the third unit represented by Formula 3 above in the copolymer may be 10 mol % to 90 mol %, specifically 20 mol % to 80 mol %, more specifically 40 mol % to 70 mol %. When the above range is satisfied, a three-dimensional network structure may be formed at a desirable level by the polymerization of —OH or —COOH group in the second unit or the third unit and —COOH group in the first unit, so that the deformation of the negative electrode may be suppressed more effectively.

The ratio of the molar content of the first unit and the total sum of the molar content of the second unit and the third unit in the copolymer may be 1:9 to 9:1, specifically 1:4 to 4:1, more specifically 1:1.75 to 1.75:1. When the above range is satisfied, the deformation of the negative electrode may be suppressed more effectively.

The weight average molecular weight of the copolymer may be 200,000 g/mol to 1,000,000 g/mol, specifically 200,000 g/mol to 750,000 g/mol, more specifically 300,000 g/mol to 600,000 g/mol. When the above range is satisfied, the brittleness of the polymer layer is sufficient, so that the deformation of the negative electrode may be effectively suppressed, and at the same time, coating of the polymer layer is facilitated and damage (e.g., cracks, etc.) to the polymer layer is prevented, so that the resistance of the battery may be reduced, and the output properties, lifespan properties, and durability thereof may be improved.

The copolymer may be a random copolymer, and in this case, a three-dimensional network structure may be formed at a desirable level by the polymerization of —OH or —COOH group in the second unit or the third unit and —COOH group in the first unit, so that the brittleness of the polymer layer is increased to suppress the deformation of the negative electrode more effectively.

The thickness of the polymer layer may be 0.1 μm to 10 μm, specifically 0.5 μm to 2 μm. When the above range is satisfied, the deformation of the negative electrode may be effectively suppressed due to high brittleness of the polymer layer while the energy density of the battery remains high.

The polymer layer may be on the rear surface of the current collector in the following manner, but the present invention is not limited thereto.

The copolymer is introduced into a solvent and then stirred to prepare a copolymer solution. Thereafter, the copolymer solution is applied on the rear surface of a current collector by means of such as slot-die, gravure, and comma coater. Thereafter, the current collector on which the copolymer solution is applied is dried to form a polymer layer.

2) Step S2

The preliminary negative electrode active material layer may be disposed on the front surface of the current collector. In other words, the preliminary negative electrode active material layer and the polymer layer may be positioned having the current collector interposed therebetween.

The preliminary negative electrode active material layer may include a negative electrode active material.

As the negative electrode active material, a compound capable of reversible intercalation and de-intercalation of lithium may be used. Specific examples thereof may include a carbon-based material such as hard carbon, soft carbon, artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, and an Al alloy; a metal oxide which may be doped and undoped with lithium such as $SiO_x$ ($0<x<2$), $SiO_2$, $SnO_2$, a vanadium oxide, and a lithium vanadium oxide; or a composite including the metallic compound and a carbonaceous material such as an Si—C composite, or an Sn—C composite, and any one thereof or a mixture of two or more thereof may be used. Specifically, the negative electrode active material may be at least one selected from the group consisting of a carbonaceous material, $SiO_x$ ($0\leq x\leq 2$), $SnO_2$, an Si—C composite, and an Sn—C composite. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

More specifically, the negative electrode active material may include at least one of $SiO_x$ ($0\leq x<2$) and a carbon-based material. Particularly, $SiO_x$ ($0\leq x<2$) has an advantage of improving the capacity of a negative electrode, but the $SiO_x$ ($0\leq x<2$) has a disadvantage of having a large irreversible capacity, thereby having a low initial efficiency. In this respect, when following the method for manufacturing a negative electrode according to the present invention, the irreversible capacity of a negative electrode may be reduced, so that initial efficiency may be maintained even when the $SiO_x$ ($0\leq x<2$) is included in a negative electrode active material, and the capacity of the negative electrode may be improved.

The preliminary negative electrode active material layer may further include a binder. The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, poly acrylic acid, a material having the hydrogen thereof substituted with Li, Na, or Ca, and the like. In addition, the binder may include various copolymers thereof.

The preliminary negative electrode active material layer may further include a conductive material. The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon powder; metal powder such as aluminum powder, and nickel powder; a conductive whisker such as zinc oxide and potassium titanate; a conductive metal oxide such as titanium oxide; a conductive material such as a polyphenylene derivative, and the like may be used.

The loading amount of the preliminary negative electrode active material layer may be 0.006 g/cm$^2$ to 0.03 g/cm$^2$, specifically 0.008 g/cm$^2$ to 0.02 g/cm$^2$. When the above range is satisfied, the energy density of the battery may be maintained high, and the coating of the preliminary negative electrode active material layer may be facilitated even with the use of a thin current collector.

The thickness of the preliminary negative electrode active material layer may be 50 μm to 300 μm, specifically 100 μm to 180 μm. When the above range is satisfied, the energy density of the battery may be maintained high, and the coating of the preliminary negative electrode active material layer may be facilitated even with the use of a thin current collector.

The preliminary negative electrode active material layer may be formed through a commonly known method. For example, a negative electrode slurry including the negative electrode active material, the binder, and the conductive material may be applied on the front surface of the current collector and then dried to form the preliminary negative electrode active material layer.

3) Step S3

The pre-lithiation layer may be formed on (the front surface of) the preliminary active material layer. The pre-lithiation layer and the current collector may be disposed having the preliminary active material layer interposed therebetween.

The pre-lithiation layer serves to perform pre-lithiation by supplying lithium ions to the preliminary active material layer. Therefore, when pre-lithiation is finally performed, the pre-lithiation layer may disappear, or only a portion of lithium included in the pre-lithiation layer may remain on the preliminary active material layer.

The pre-lithiation layer may include lithium, and specifically, the pre-lithiation layer may be composed of lithium.

The thickness of the pre-lithiation layer may be 0.1 μm to 20 μm, specifically 1 μm to 10 μm. When the above range is satisfied, the effect of improving the energy of a battery by the pre-lithiation is pronounced, and the risk of lithium precipitation may be minimized.

The ratio of the thickness of the polymer layer to the thickness of the pre-lithiation layer may be 1:200 to 100:1, specifically 1:100 to 20:1, more specifically 1:20 to 50:1.

When the above range is satisfied, stress generated in the negative electrode during pre-lithiation may be effectively relieved, so that the deformation of the negative electrode may be reduced to a minimum.

Although not necessarily limited thereto, the pre-lithiation layer may be formed on the preliminary negative electrode active material layer in the following manner.

For example, the pre-lithiation layer may be formed on the preliminary negative electrode active material layer by forming a lithium layer on a release film such as PET by a vaporization method and the like, and then bonding the lithium layer and the preliminary negative electrode active material layer to each other, followed by removing the release film.

<Negative Electrode>

A negative electrode according to another embodiment of the present invention may include a current collector, a negative electrode active material layer formed on the front surface of the current collector, and a polymer layer formed on the rear surface of the current collector, wherein the polymer layer includes a copolymer having a first unit represented by Formula 1 below, and at least one of a second unit represented by Formula 2 below and a third unit represented by Formula 3 below.

[Formula 1]

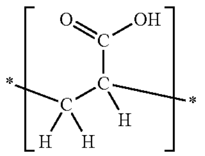

[Formula 2]

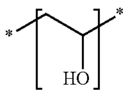

[Formula 3]

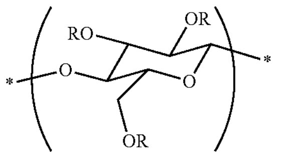

In Formula 3 above, R is each independently H or $CH_2CO_2H$.

The current collector, the polymer layer, and the copolymer are the same as the current collector, the polymer layer, and the copolymer of the embodiment described above, and thus, descriptions thereof will be omitted.

The negative electrode active material layer means a negative electrode active material layer in which lithium ions supplied from the pre-lithiation layer of the above-described embodiment are inserted into the preliminary negative electrode active material layer of the above-described embodiment.

The negative electrode may further include lithium on the negative electrode active material layer. As described above, since lithium of the pre-lithiation layer of the above-described embodiment is inserted into the preliminary negative electrode active material layer, the pre-lithiation layer may disappear, or only a portion of the lithium of the pre-lithiation layer may remain on the negative electrode active material layer. At this time, the lithium remaining in part corresponds to the above-described lithium on the negative electrode active material layer.

<Secondary Battery>

A secondary battery according to yet another embodiment of the present invention may include a negative electrode. Specifically, the secondary battery may include an electrode assembly and an electrolyte, and the electrode assembly may include the negative electrode, a positive electrode, and a separator.

The negative electrode is the negative electrode described above, and thus, the description thereof will be omitted.

The positive electrode may include a positive electrode current collector and a positive electrode active material layer formed on the positive electrode current collector and including a positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be prepared on the surface of the positive electrode current collector to improve the adhesion of the positive electrode active material. For example, the current collector may be used in various forms such as a film, a sheet, a foil, a net, a porous body, a foam, and a non-woven body.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium iron oxide such as $LiFe_3O_4$; a lithium manganese oxide such as a formula $Li_{1+c1}Mn_{2-c1}O_4$ ($0 \le c1 \le 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \le c2 \le 0.3$); a lithium manganese composite oxide represented by the formula $LiMn_{2-c3}M_{c3}O_2$ (wherein, M is any one of Co, Ni, Fe, Cr, Zn, or Ta, and $0.01 \le c3 \le 0.1$), or by the formula (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The electrode assembly includes a structure in which the negative electrode and the positive electrode are spaced apart from each other having the separator interposed therebetween. At this time, the negative electrode of the electrode assembly may include a single-sided negative electrode in which a negative electrode active material layer is disposed on only one surface of a current collector. The single-sided negative electrode may be used as a negative electrode closest to the outermost periphery of the electrode assembly, and the single-sided negative electrode corresponds to the negative electrode of the above-described embodiment.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, a cyclic carbonate such as ethylene carbonate and propylene carbonate may preferably be used since it is an organic solvent of high viscosity and has high dielectric constant to dissociate a lithium salt well. Such a cyclic carbonate may be more preferably used since when it is mixed with a linear carbonate of low viscosity and low dielectric constant such as dimethyl carbonate and diethyl carbonate in an appropriate ratio, an electrolyte having a high electric conductivity is prepared.

As the metal salt, a lithium salt may be used. The lithium salt is a material which is easily dissolved in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing Negative Electrode (1) Forming Polymer Layer

A random copolymer (weight average molecular weight: 250,000 g/mol) composed of a first unit (60 mol %) of Formula 1 below and a second unit (40 mol %) of Formula 2 below was introduced to acetone, which is a solvent, to prepare a copolymer solution having a solid content of 7 wt %.

[Formula 1]

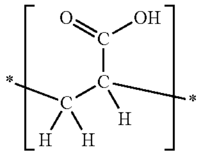

[Formula 2]

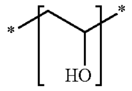

Thereafter, the solution was applied on a copper current collector having a thickness of 8 μm and dried at 60° C. to form a polymer layer on the rear surface of the current collector.

(2) Forming Preliminary Negative Electrode Active Material Layer 92 wt % of a negative electrode active material (graphite: SiO=7:3 weight ratio), 3 wt % of Denka black (conductive material), 3.5 wt % of SRB (binder), and 1.5 wt % of CMC (thickener) were added to water to prepare a negative electrode slurry.

The negative electrode slurry was applied on the front surface of the current collector (a surface positioned in the opposite direction to a surface of the current collector on which the polymer layer is formed), dried, and then roll-pressed to form a preliminary negative electrode active material layer. The loading amount of the preliminary negative electrode active material layer was 0.009 g/cm$^2$, the thickness thereof was 149 μm, and the porosity thereof was 26%.

(3) Forming Pre-Lithiation Layer

A lithium layer (thickness: 5 μm) composed of lithium was vapor-deposited on a PET release film to prepare a film for pre-lithiation having a thickness of 5 μm. Thereafter, the film for pre-lithiation and the negative electrode were adhered to each other to bond the lithium layer to the preliminary negative electrode active material layer. Thereafter, while maintaining the roll-pressing roll gap to correspond to 90% of the total thickness of the film for pre-lithiation and the negative electrode. roll-pressing was performed. Thereafter, the release film was removed to form a pre-lithiation layer on the preliminary negative electrode active material layer and perform pre-lithiation.

Finally, the thickness of the polymer layer in the negative electrode was 0.5 μm.

Example 2: Manufacturing Negative Electrode

A negative electrode was manufactured in the same manner as in Example 1 except that while a copolymer composed of a first unit of Formula 1 above and a second unit of Formula 2 above was used as in Example 1, but the weight average molecular weight of the copolymer was 500,000 g/mol.

Example 3: Manufacturing Negative Electrode

A negative electrode was manufactured in the same manner as in Example 1 except that instead of the copolymer of Example 1, a copolymer (weight average molecular weight: 250,000 g/mol) composed of a first unit (60 mol %) of Formula 1 above and a third unit (40 mol %) of Formula 3 below was used.

[Formula 3]

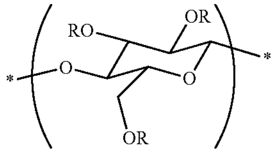

Comparative Example 1: Manufacturing Negative Electrode

A negative electrode was manufactured in the same manner as in Example 1 except that instead of the copolymer of Example 1, polyethylene (PE) (weight average molecular weight: 250,000 g/mol) was used.

Comparative Example 2: Manufacturing Negative Electrode

A negative electrode was manufactured in the same manner as in Example 1 except that instead of the copolymer of Example 1, polyacrylic acid (PAA) (weight average molecular weight: 250,000 g/mol) was used.

Comparative Example 3: Manufacturing Negative Electrode

A negative electrode was manufactured in the same manner as in Example 1 except that a polymer layer was not formed.

EXPERIMENTAL EXAMPLES

Experimental Example 1: Evaluation of Deformation of Negative Electrode

The negative electrode (15 cm×15 cm) of each of Examples 1 to 3 and Comparative Examples 1 to 3 was left to stand for 2 hours at 25° C., and then the degree of deformation of the negative electrode was evaluated.

Figure 3:
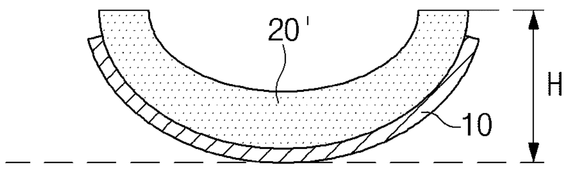
FIG. 3 is a schematic diagram for explaining the measurement method of Experimental Example 1 of the present specification.

After being left to stand, the negative electrode was deformed as shown in FIG. 3 (polymer layer not shown). Specifically, the end of the negative electrode was rolled toward an upper portion of the negative electrode active material layer, so that the cross-section of the negative electrode became to have a curve form having a curvature. At this time, a distance H (in direction perpendicular to the ground) between the ground and the end (of the four vertexes of the negative electrode, a vertex that is spaced farthest from the ground) of the negative electrode was measured and shown in Table 1. The H was measured with a steel ruler.

TABLE 1

| | H (mm) |
|---|---|
| Example 1 | 9 |
| Example 2 | 5 |
| Example 3 | 10 |
| Comparative Example 1 | 16 |
| Comparative Example 2 | 12 |
| Comparative Example 3 | Two edges facing the negative electrode meet each other on the negative electrode active material layer, so that the negative electrode becomes to have a cylinder form. |

Referring to Table 1 above, the negative electrode of each of Examples 1 to 3 has a smaller degree of deformation compared to the negative electrode of each of Comparative Examples. Specifically, in the case of Comparative Example 3, it was confirmed that the negative electrode was bent the most, making the H measurement meaningless. In the case of Comparative Examples 1 and 2, the brittleness of the polymer layer was poor, so that the deformation of the negative electrode was not effectively controlled.

The invention claimed is:

1. A negative electrode comprising:

a current collector having a front surface and a rear surface which respectively have a continuous surface;

a negative electrode active material layer on the front surface of the current collector; and a polymer layer on the rear surface of the current collector, wherein the negative electrode active material layer is not in direct contact with the polymer layer, wherein the negative electrode active material layer is in direct contact with the current collector, and wherein the polymer layer comprises a copolymer having a first unit represented by Formula 1, and at least one of a second unit represented by Formula 2 or a third unit represented by Formula 3:

[Formula 1]

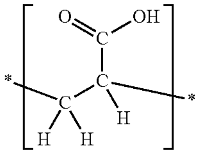

-continued

[Formula 2]

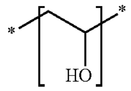

[Formula 3]

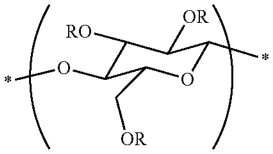

wherein, in Formula 3, R is each independently H or $CH_2CO_2H$.

2. The negative electrode of claim 1, wherein a weight average molecular weight of the copolymer is from 200,000 g/mol to 1,000,000 g/mol.

3. The negative electrode of claim 1, wherein a weight average molecular weight of the copolymer is from 300,000 g/mol to 600,000 g/mol.

4. The negative electrode of claim 1, wherein an amount of a sum of the second unit represented by Formula 2 and the third unit represented by Formula 3 present in the copolymer is from 10 mol % to 90 mol %.

5. The negative electrode of claim 1, wherein a thickness of the polymer layer is from 0.1 μm to 10 μm.

6. The negative electrode of claim 1, further comprising lithium on the negative electrode active material layer.

7. A secondary battery comprising the negative electrode of claim 1.

* * * * *